UNITED STATES PATENT OFFICE.

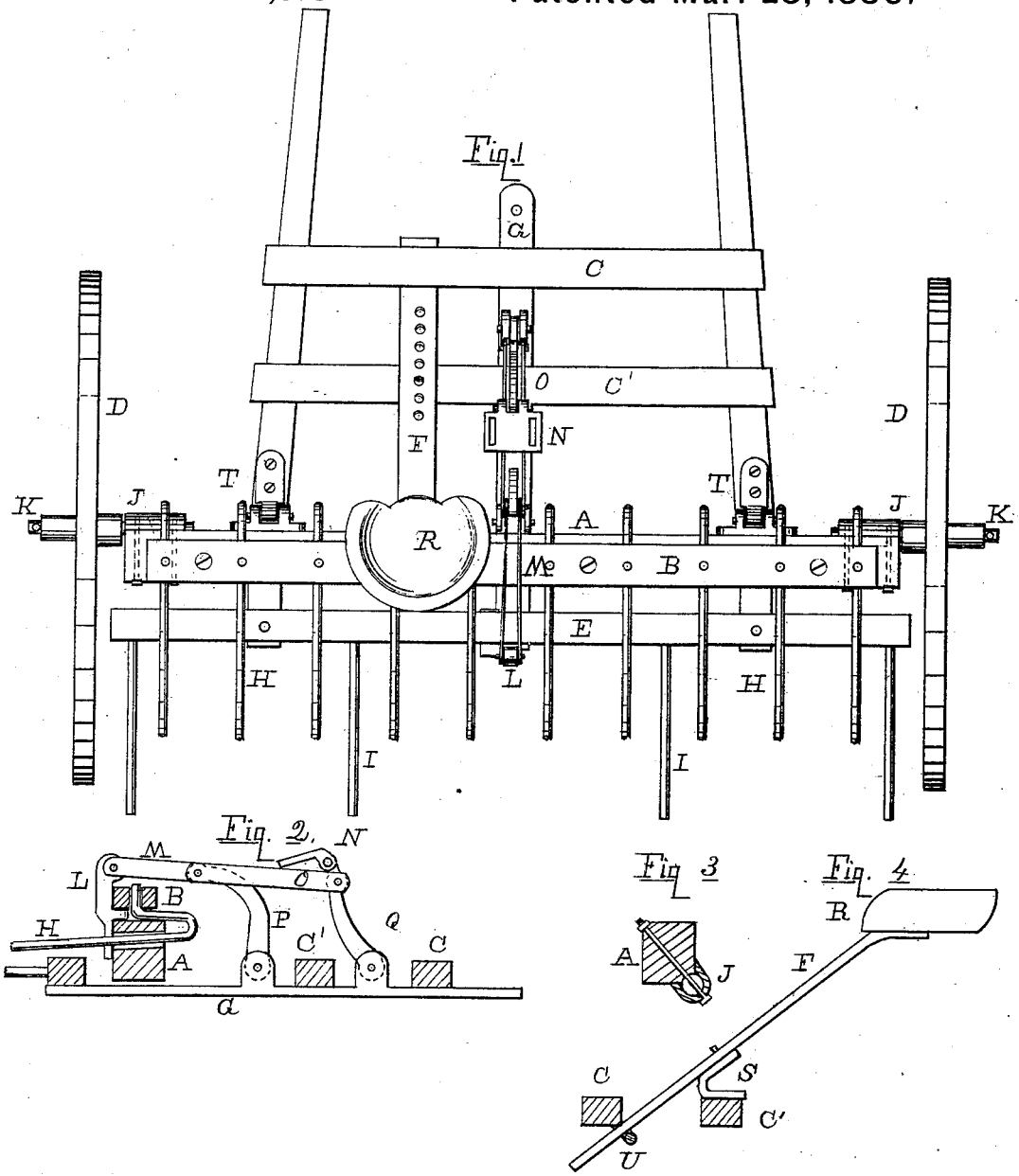

BENJAMIN OWEN, OF DAYTON, OHIO.

HORSE-RAKE.

SPECIFICATION forming part of Letters Patent No. 225,716, dated March 23, 1880.

Application filed November 20, 1877.

*To all whom it may concern:*

Be it known that I, BENJAMIN OWEN, of Dayton, in the county of Montgomery and State of Ohio, have invented new and useful Improvements in Horse-Rakes, which improvements are fully set forth in the following specification and accompanying drawings, in which—

Figure 1 is a top view of the horse-rake. Fig. 2 is a longitudinal section, illustrating the dumping mechanism. Fig. 3 is a transverse section of the axle near the end. Fig. 4 is a transverse section, illustrating the support to the seat.

The nature of my improvements consists in, first, the mechanism by which the rake is discharged of its load; second, the manner of securing the teeth to the rake-head.

The rake-head or axle A is mounted on the wheels D. The clip J embraces the spindle K, and has a bearing against the front and lower surface of the axle. The clip embraces the end of the spindle K, and through both the clip and spindle are drilled holes, and corresponding holes are bored in the axle, into which bolts are placed for the purpose of firmly securing the spindle to the axle.

The position of the bolts is indicated by dotted lines at Fig. 1. The relation of the several parts is clearly illustrated at Fig. 3. This device secures the spindle to the axle in a most substantial manner, and secures the spindles at a point which favors the discharge of the rake.

The thills are attached to the axle by the hinges T, which support the thills, when the rake-head is in horizontal position, nearly in contact with the same. The center of oscillation being sufficiently forward of axes of the spindles to bring the shafts, with superincumbent weight, nearly in equipoise with the rake-head and teeth, thus enabling the operator to discharge the rake with slight exertion.

On the thills, to the rear of the rake-head, is bolted the bar E, which supports the cleaner-sticks I. The thills are attached by the cross-bars C C'. The seat is supported from these bars.

The bar F, to which the seat R is attached, passes through a staple, U, of the bar C, and to the bar C' is secured a bevel-plate, S, the said plate having a pin to enter one of a series of holes in the supporting-bar. The arrangement of these parts is shown at Fig. 4. This arrangement is for the purpose of adjusting the elevation of the seat to suit the stature of the operator.

The bar B is situated over the axle, to which it is secured by bolts having thimbles surrounding them, which separate the parts a little more than the diameter of the teeth. (See Fig. 2.) This bar has a series of holes centrally located, to receive the vertical ends of the teeth H. The tooth is of the form shown in Fig. 2. From the vertical end it is bent at a right angle; then it is bent in a semicircle, and passes through a mortise in the axle, whence it has the usual form of teeth for horse-rakes. A rake-tooth thus held admits of a slight oscillation, is held in position against lateral deviation, and the spring of the tooth, from its length and curve, adapts it very perfectly to undulations of surface. For the purpose of discharging the rake the device is used illustrated at Fig. 2.

L is an arm bolted to the rear of the rake-head, and this is connected by bars M to the pivotal arm P, and this is connected to the pivotal arm Q by bars O, these arms being supported on the bar G, which is supported by the cross-bars C C'.

To the arm Q is pivoted the foot-plate N, top view at Fig. 1. This foot-plate has side orifices, through which straps may be secured to bind the foot of the operator. The purpose of the strap is, in case the weight on the shafts is too heavy to be overcome by the gravity of the teeth, the operator can with his leg draw the plate and its attachments to throw the teeth back into position to resume the operation of raking.

The operation may be described thus: As the rake is being drawn by the horse the operator's foot is firmly pressed down on the foot-plate, the effect of which is to hold the teeth to the ground. When the rake has received its load the foot is thrust forward, thus causing the teeth to be sufficiently elevated to dump their load, and then the teeth are permitted to drop back into position for raking;

or the operation is effected, as heretofore described, by aid of the limb in withdrawal.

The arm P serves to arrest the downward movement of the foot while the pressure is being made to hold the teeth in contact with the surface of the ground.

The relation of the hinges and spindles is such that the cleaner-sticks are depressed during the operation of discharge.

Having fully described my invention, what I claim as my invention, is—

1. The arm L, bars M and O, arms P and Q, foot-plate N, the supporting-bar G, and hinges T, in combination with the rake-head A and spindle K, for the purpose of discharging the rake with diminished effort on the part of the operator.

2. The eyed and curved end of tooth H in relation to bar B, supported on thimbles, in combination with the axle A, substantially as and for the purpose specified.

BENJAMIN OWEN.

Witnesses:
B. PICKERING,
W. H. CLARK.